United States Patent
Tawosi et al.

(10) Patent No.: US 12,536,012 B2
(45) Date of Patent: Jan. 27, 2026

(54) SYSTEM AND METHOD FOR PERFORMING EARLY DELAYED ISSUE DETECTION AND PROVIDING ALERT NOTIFICATION

(71) Applicant: JPMorgan Chase Bank, N.A., New York, NY (US)

(72) Inventors: Vali Tawosi, London (GB); Salwa Husam Alamir, Bournemouth (GB); Ravi Kumar Tummalapenta, Iselin, NJ (US); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 186 days.

(21) Appl. No.: 18/231,019

(22) Filed: Aug. 7, 2023

(65) Prior Publication Data

US 2025/0053414 A1    Feb. 13, 2025

(51) Int. Cl.
  *G06F 8/70*    (2018.01)
(52) U.S. Cl.
  CPC ...................... *G06F 8/70* (2013.01)
(58) Field of Classification Search
  CPC .................................................. G06F 8/70
  USPC ............................... 717/120–140; 706/25–45
  See application file for complete search history.

(56) References Cited

U.S. PATENT DOCUMENTS

| | | | | |
|---|---|---|---|---|
| 6,519,763 B1 * | 2/2003 | Kaufer | ................. | G06Q 10/109 706/45 |
| 8,819,617 B1 * | 8/2014 | Koenig | ..................... | G06F 8/70 717/102 |
| 10,042,636 B1 * | 8/2018 | Srivastava | ............. | G06N 20/00 |
| 10,628,292 B2 * | 4/2020 | Rosomoff | ................. | G06F 8/30 |
| 11,055,666 B2 * | 7/2021 | Kakadiya | ......... | G06Q 10/06312 |
| 11,113,048 B1 * | 9/2021 | Tanniru | ................... | G06F 40/30 |
| 11,301,242 B2 * | 4/2022 | Thakkar | ............ | G06F 16/90344 |
| 11,303,666 B1 * | 4/2022 | Peters | ................. | H04L 63/1441 |
| 11,580,842 B1 * | 2/2023 | Hauser | ................. | G08B 21/182 |
| 12,299,427 B1 * | 5/2025 | Pal | ............................. | G06F 8/60 |
| 2022/0122025 A1 * | 4/2022 | Amit | ........................ | G06F 8/77 |

(Continued)

OTHER PUBLICATIONS

Zellner et al, "Understanding Delay Awareness and Mitigation Mechanisms through an Iterative Design and Evaluation of a Prototype Alert System for Complex Teamwork", ACM, pp. 1-28 (Year: 2023).*

(Continued)

*Primary Examiner* — Anil Khatri
(74) *Attorney, Agent, or Firm* — GREENBLUM & BERNSTEIN, P.L.C.

(57) ABSTRACT

A method and system for determining and mitigating a potential delay in task completion are disclosed. The method includes extracting previously resolved tasks and changes occurred to each of the previously resolved tasks, and calculating features for training a machine learning model. The method further includes dividing the tasks into different groups and training the machine learning model using the calculated features associated with the different groups. The method then starts a task and partially processes the respective task until reaching a cutoff time, and based on change history of the task up to the cutoff time and using the trained machine learning model, determines whether a delay is expected or not for the task.

17 Claims, 6 Drawing Sheets

(56) References Cited

U.S. PATENT DOCUMENTS

2025/0004760 A1* 1/2025 Maciel ................ G06F 8/20

OTHER PUBLICATIONS

Adamczyk et al, "If Not Now, When ?: The Effects of Interruption at Different Moments Within Task Execution", ACM, pp. 1-8 (Year: 2004).*
Hamada "Machine Learning Model to Enhance the Quality of Software Development Risk Management", IEEE, pp. 1-6 (Year: 2024).*
Zhou et al, "Risk-Based Scheduling of Security Tasks in Industrial Control Systems With Consideration of Safety", IEEE, pp. 1-12 (Year: 2020).*

* cited by examiner

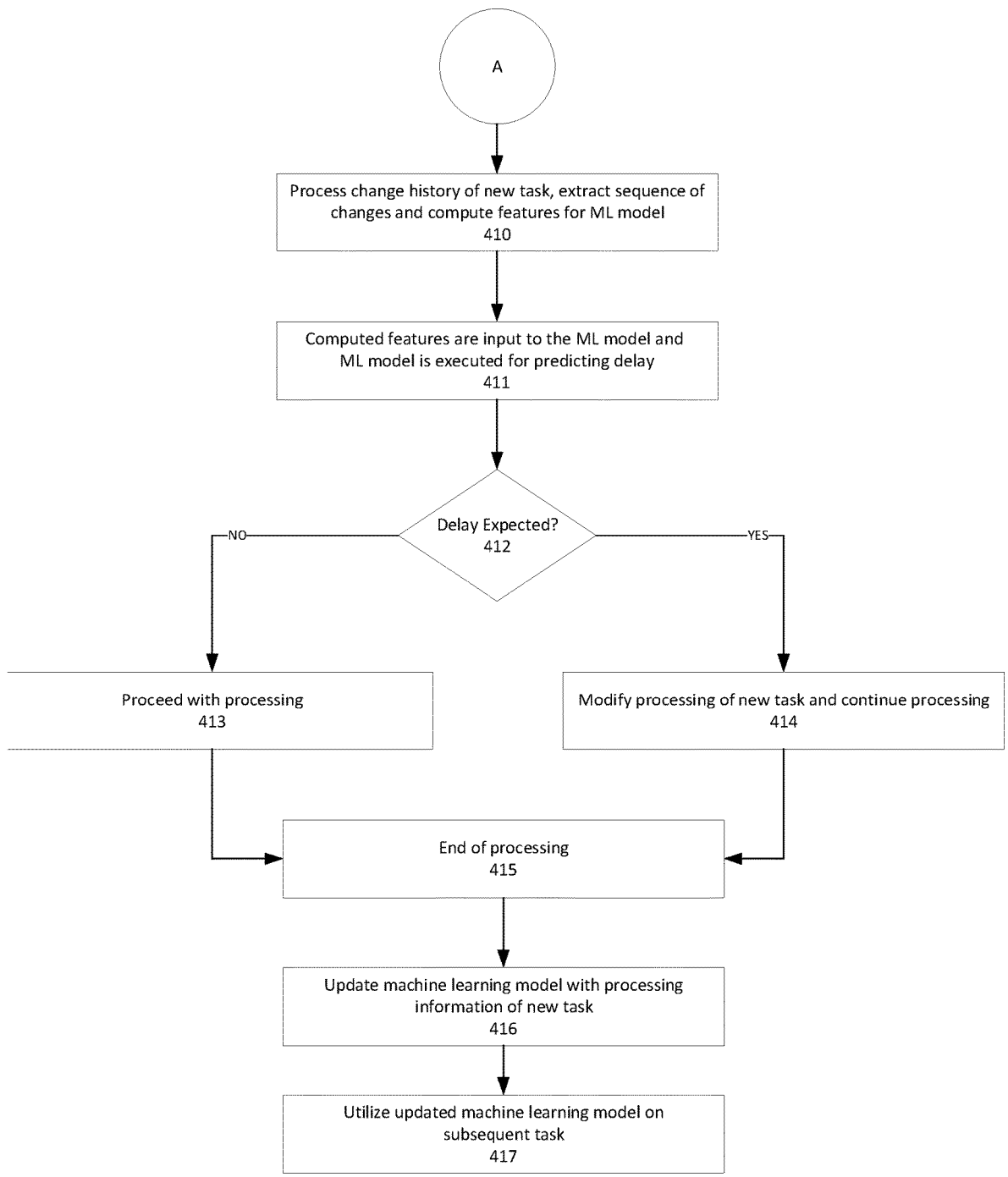

SYSTEM AND METHOD FOR PERFORMING EARLY DELAYED ISSUE DETECTION AND PROVIDING ALERT NOTIFICATION

TECHNICAL FIELD

This disclosure generally relates to performing early detection of possible issues and delays, and providing alerts for mitigating detected delay issues to minimize downstream impact.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Agile software development teams use an iterative process to produce software in small increments. In each iteration (i.e., sprint), a number of software tasks are selected for production. The selected tasks are expected to be done by the end of the sprint, which is typically two to four weeks. Detecting which tasks are prone to delay early in the sprint can help the development team and management to intervene in time to reduce such risk, which can lead to improved productivity and reduce computing expenditures and inefficiencies involved with delayed tasks.

SUMMARY

According to an aspect of the present disclosure, a method for determining and mitigating a potential delay in task completion is provided. The method includes extracting, by a processor, previously resolved tasks and related information; analyzing, by the processor, the extracted previously resolved tasks and related information; extracting, by the processor, changes occurred to each of the previously resolved tasks; calculating, by the processor, features for training a machine learning model based on the extracted changes; dividing, by the processor, the previously resolved tasks into different groups; training, the machine learning model, using the calculated features associated with the different groups of the previously resolved tasks; starting, by the processor, a sprint including a target task; determining, by the processor, a cutoff time for determining whether the target task will be completed by an end date of the sprint; processing, by the processor, the target task until reaching the cutoff time; upon reaching the cutoff time, processing change history of the target task up to the cutoff time and before the sprint is completed, and extracting a sequence of changes included in the change history; and executing the machine learning model using the extracted sequence of changes for determining whether a delay is expected or not for the target task.

According to another aspect of the present disclosure, the method further includes when the delay is not expected, continue the processing of the target task without modification until completion of the target task.

According to another aspect of the present disclosure, the method further includes when the delay is expected, modifying the processing of the target task and continue the modified processing of the target task until completion of the target task.

According to yet another aspect of the present disclosure, the modifying includes a modification to allocated resources for the processing of the target task.

According to another aspect of the present disclosure, the modifying includes a modification to a sequence of the processing of the target task.

According to a further aspect of the present disclosure, the different groups include a first group of tasks that were completed within their respective sprints, and a second group of tasks that were unable to be completed within their respective sprints.

According to yet another aspect of the present disclosure, the method further includes when the target task is completed, updating the machine learning model with processing information of the target task.

According to a further aspect of the present disclosure, the method further includes executing the updated machine learning model on a subsequent task for determining whether the subsequent task will be completed prior to completion of its respective sprint.

According to another aspect of the present disclosure, the method further includes outputting a delay alert when the delay is expected for the target task.

According to a further aspect of the present disclosure, the delay alert is a sound signal outputted by a speaker.

According to a further aspect of the present disclosure, the delay alert is a flashing light.

According to a further aspect of the present disclosure, the delay alert is an automated voice call.

According to a further aspect of the present disclosure, the delay alert is a text transmission to a receiving device.

According to a further aspect of the present disclosure, the machine learning model is a neural network model.

According to a further aspect of the present disclosure, the cutoff time is at most six days after starting the sprint.

According to a further aspect of the present disclosure, the cutoff time is determined by the machine learning model.

According to a further aspect of the present disclosure, the changes occurred to each of the previously resolved tasks are extracted in sequence.

According to a further aspect of the present disclosure, the previously resolved tasks is divided based on a task type, completion timeframe and resource allocation.

According to an aspect of the present disclosure, a system for determining and mitigating a potential delay in task completion is provided. The system includes a memory, a display and a processor. The system is configured to perform: extracting previously resolved tasks and related information; analyzing the extracted previously resolved tasks and related information; extracting changes occurred to each of the previously resolved tasks; calculating features for training a machine learning model based on the extracted changes; dividing the previously resolved tasks into different groups, the different groups include a first group and a second group; training, the machine learning model, using the calculated features associated with the different groups of the previously resolved tasks; starting a sprint including a target task; determining a cutoff time for determining whether the target task will be completed by an end date of the sprint; processing the target task until reaching the cutoff time; upon reaching the cutoff time, processing change history of the target task up to the cutoff time and before the sprint is completed, and extracting a sequence of changes included in the change history; and executing the machine learning model using the extracted sequence of changes for determining whether a delay is expected or not for the target task.

According to another aspect of the present disclosure, a non-transitory computer readable storage medium that stores a computer program for determining and mitigating a potential delay in task completion is provided. The computer program, when executed by a processor, causes a system to perform multiple processes including: extracting previously resolved tasks and related information; analyzing the extracted previously resolved tasks and related information; extracting changes occurred to each of the previously resolved tasks; calculating features for training a machine learning model based on the extracted changes; dividing the previously resolved tasks into different groups, the different groups include a first group and a second group; training, the machine learning model, using the calculated features associated with the different groups of the previously resolved tasks; starting a sprint including a target task; determining a cutoff time for determining whether the target task will be completed by an end date of the sprint; processing the target task until reaching the cutoff time; upon reaching the cutoff time, processing change history of the target task up to the cutoff time and before the sprint is completed, and extracting a sequence of changes included in the change history; and executing the machine learning model using the extracted sequence of changes for determining whether a delay is expected or not for the target task.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIGS. 4A-4B illustrate a method for providing an early delay issue detection in accordance with an exemplary embodiment.

DETAILED DESCRIPTION

Figure 1:
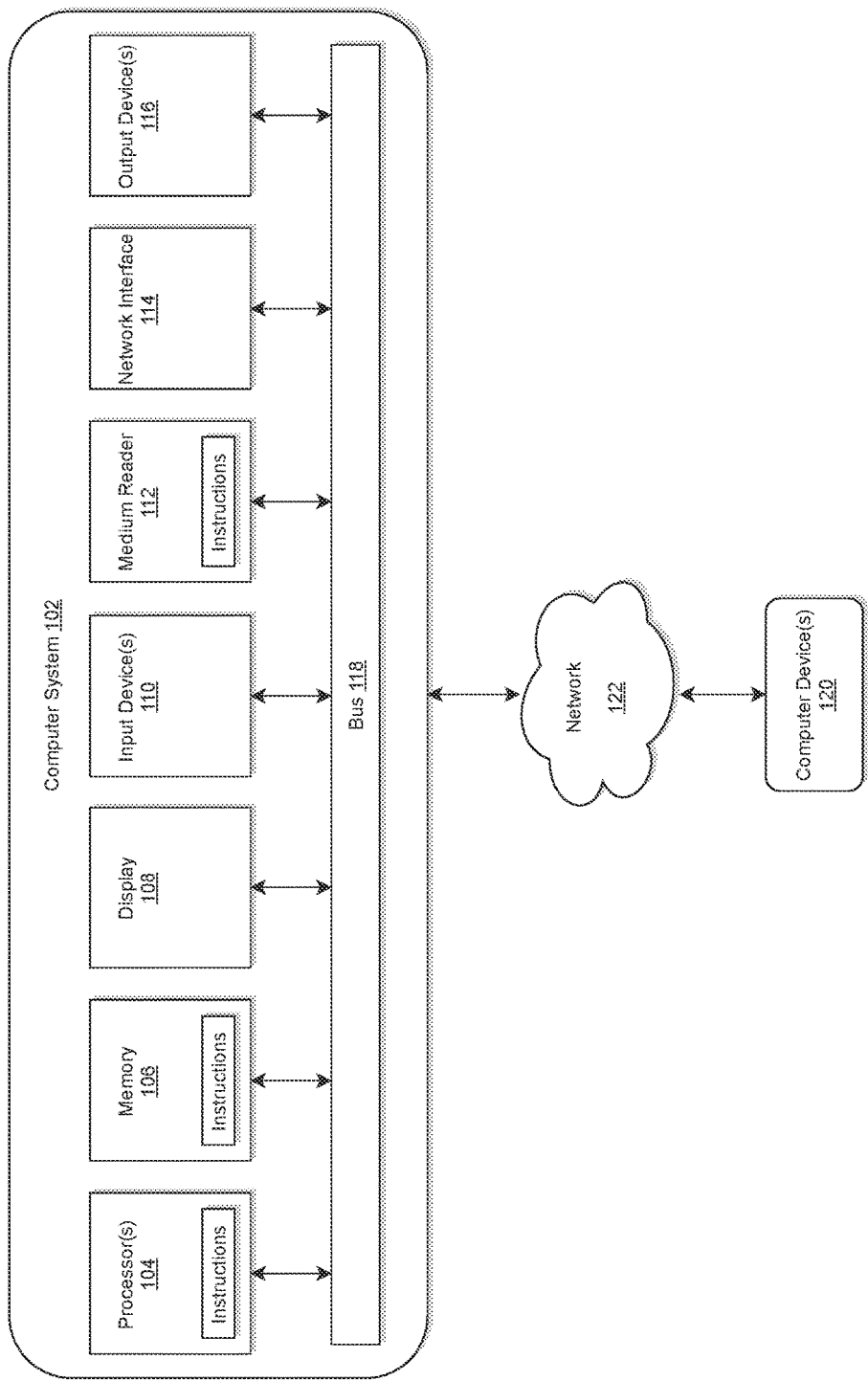
FIG. 1 illustrates a computer system for implementing an early delay issue detection (EDID) system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing an early delay issue detection (EDID) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
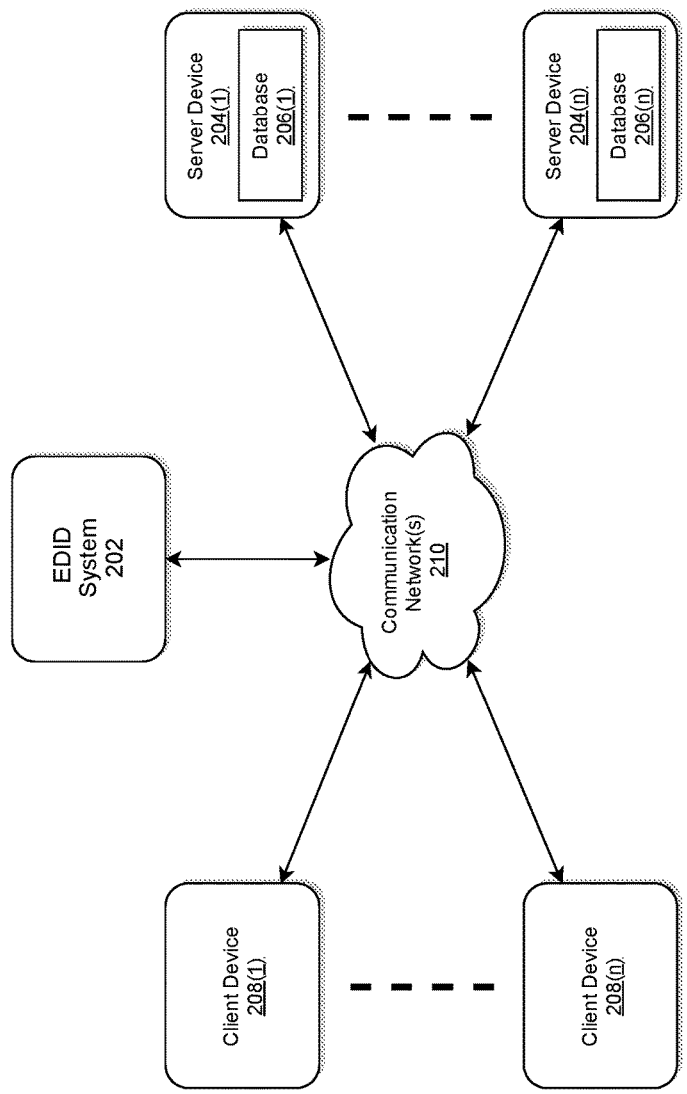
FIG. 2 illustrates an exemplary diagram of a network environment with an EDID system in accordance with an exemplary embodiment.

FIG. 2 illustrates an exemplary diagram of a network environment with an EDID system in accordance with an exemplary embodiment.

An EDID system 202 may be implemented with one or more computer systems similar to the computer system 102 as described with respect to FIG. 1.

The EDID system 202 may store one or more applications that can include executable instructions that, when executed by the EDID system 202, cause the EDID system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the EDID system 202 itself, may be located in virtual server(s) running in a cloud-based computing environment rather than being tied to one or more specific physical network computing devices. Also, the application(s) may be running in one or more virtual machines (VMs) executing on the EDID system 202. Additionally, in one or more embodiments of this technology, virtual machine(s) running on the EDID system 202 may be managed or supervised by a hypervisor.

In the network environment 200 of FIG. 2, the EDID system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the EDID system 202, such as the network interface 114 of the computer system 102 of FIG. 1, operatively couples and communicates between the EDID system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the EDID system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The EDID system 202 may be a standalone device or integrated with one or more other devices or apparatuses, such as one or more of the server devices 204(1)-204(n), for example. In one particular example, the EDID system 202 may be hosted by one of the server devices 204(1)-204(n), and other arrangements are also possible. Moreover, one or more of the devices of the EDID system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the EDID system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the EDID system 202 that may efficiently provide a platform for implementing a cloud native EDID system module, but the disclosure is not limited thereto.

The client devices 208(1)-208(n) may run interface applications, such as standard web browsers or standalone client applications, which may provide an interface to communicate with the EDID system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the EDID system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the EDID system 202, the server devices 204(1)-204(n), or the client devices 208(1)-208(n), for example, may be configured to operate as virtual instances on the same physical machine. For example, one or more of the EDID system 202, the server devices 204(1)-204(n), or the client devices 208(1)-208(n) may operate on the same physical device rather than as separate devices communicating through communication network(s) 210. Additionally, there may be more or fewer EDID system 202, server devices 204(1)-204(n), or client devices 208(1)-208(n) than illustrated in FIG. 2. According to exemplary embodiments, the EDID system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
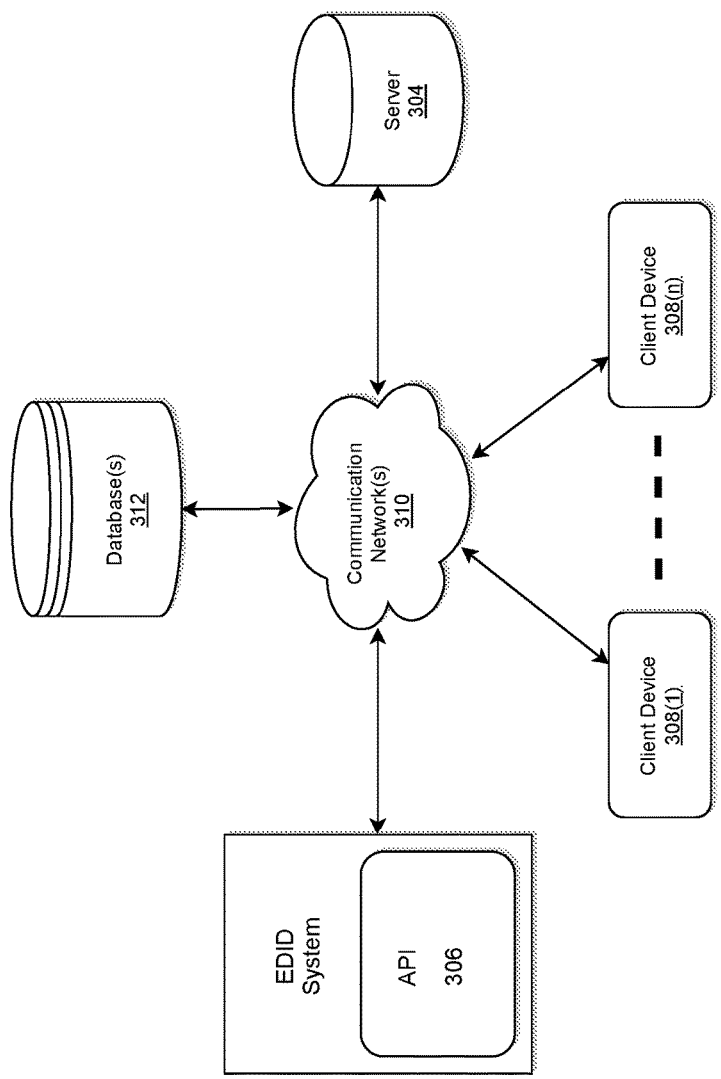
FIG. 3 illustrates a system diagram for implementing an EDID system in accordance with an exemplary embodiment.

FIG. 3 illustrates a system diagram for implementing an EDID system in accordance with an exemplary embodiment.

As illustrated in FIG. 3, the system 300 may include an EDID system 302 within which a group of API modules 306 is embedded, a server 304, a database(s) 312, a plurality of client devices 308(1) . . . 308(n), and a communication network 310.

According to exemplary embodiments, the EDID system 302 including the API modules 306 may be connected to the server 304, and the database(s) 312 via the communication network 310. Although there is only one database that has been illustrated, the disclosure is not limited thereto. Any number of databases may be utilized. The EDID system 302 may also be connected to the plurality of client devices 308(1) . . . 308(n) via the communication network 310, but the disclosure is not limited thereto.

According to exemplary embodiment, the EDID system 302 is described and shown in FIG. 3 as including the API modules 306, although it may include other rules, policies, modules, databases, or applications, for example. According to exemplary embodiments, the database(s) 312 may be embedded within the EDID system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable EDID system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the EDID system 302. In this regard, the plurality of client devices 308(1) . . . 308(n) may be "clients" of the EDID system 302 and are described herein as such. Nevertheless, it is to be known and understood that the plurality of client devices 308(1) . . . 308(n) need not necessarily be "clients" of the EDID system 302, or any entity described in association therewith herein. Any additional or alternative relationship may exist between either or both of the plurality of client devices 308(1) . . . 308(n) and the EDID system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the EDID system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The EDID system 302 may be the same or similar to the EDID system 202 as described with respect to FIG. 2, including any features or combination of features described with respect thereto.

Figure 4A:
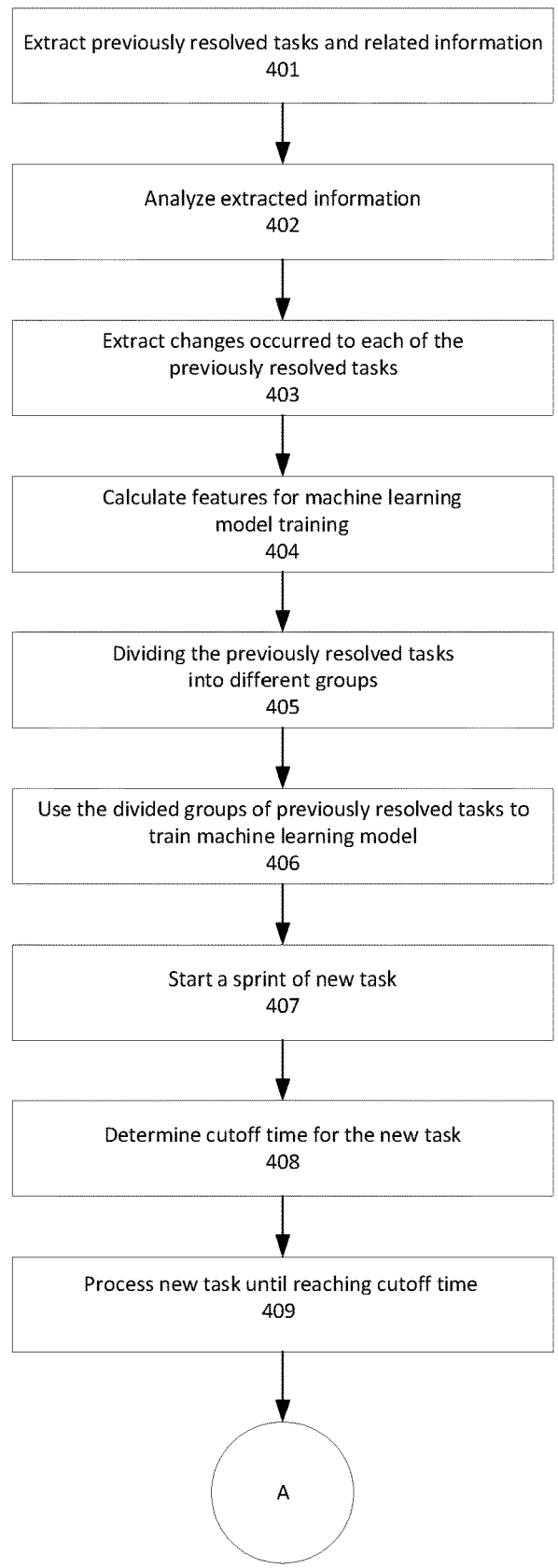

FIGS. 4A-4B illustrate a method for providing an early delay issue detection in accordance with an exemplary embodiment.

In operation 401, previously resolved tasks and corresponding information are extracted from a database or system storing such information. According to exemplary aspects, previously executed sprints including one or more tasks and related information may be stored in one or more databases or system. In an example, such information may be stored in an issue tracking system. The stored information may specify a name or description of previously executed sprints and included tasks, sprint start date and end date, an indication of whether each of the tasks included in the sprint were timely completed or not, any adjustment to performance of the tasks, resources allocated for performing each of the tasks and the like. However, aspects of the present disclosure are not limited thereto, such that additional or different set of information may be stored.

In operation 402, the extracted information may be analyzed. For example, the extracted information may be analyzed to determine one or more of a category for an executed task, steps performed for executing the respective task, an amount of time taken for completing the respective task, resources allocated for performing the respective task, any adjustments for completing the respective tasks, any issues in completing the respective task and the like.

In operation 403, adjustments or changes occurred to each of the previous resolved tasks are extracted. According to exemplary aspects, previous tasks that were completed on-time or at the end of a respective sprint with one or more changes or adjustments are identified. In an example, if additional resources were added to complete a task after initial start, such task may be extracted along with corresponding information.

In operation 404, one or more features are calculated from the information extracted in operation 403 for performing machine learning (ML) model training or generating. According to exemplary aspects, the calculated features may be utilized to train an existing machine learning algorithm. However, aspects of the present disclosure are not limited thereto, such that the calculated features may be utilized for building or generating a machine learning model. Although machine learning is described in the present application, aspects of the present disclosure are not limited thereto, such that other forms of artificial intelligence (AI) models or algorithms may be utilized, such as neural networks models or algorithms.

In operation 405, the previously resolved tasks are divided into different groups. In an example, the different groups may include previously resolved tasks that were completed prior to an end date of its respective sprint, and previously resolved tasks that were unable to be completed prior to the end date of its respective sprint. Moreover, the different groups may be further separated based on amount of time completed before or after the end date of respective sprint or sprints. However, aspects of the present disclosure are not limited thereto, such that the previously resolved tasks may be further grouped or divided according to various attributes, such as a description of the task performed, a type of task, change or adjustment history of processing of the new task, task completion time, resource allocation history, whether the task was successfully completed before the end of its sprint, and the like.

In operation 406, the divided groups may then be utilized to train or generate a machine learning model. More specifically, a group including the previously resolved tasks that were successfully completed before the end date of its sprint may be utilized for recognizing patterns of actions, changes or adjustments made for the respective tasks for recognizing a respective task that may have a risk of being incomplete by the end of its sprint, and determine whether an adjustment or change to the respective task may be implemented for removing or mitigating such risk. Further, a group including the previously resolved tasks that were unsuccessfully completed before the end date of its sprint may also be utilized to train the machine learning model, such that the trained or generated machine learning model may determine or recognize actions, changes or adjustments that are ineffective in mitigating the risk of incompletion.

In an example, artificial intelligence or machine learning algorithms may be generative, in that the artificial intelligence or machine learning algorithms may be executed to perform data pattern detection, and to provide an output based on the data pattern detection. More specifically, an output may be provided based on a historical pattern of data, such that with more data or more recent data, more accurate outputs may be provided. Accordingly, the machine learning or artificial intelligence models may be constantly updated after a predetermined number of runs or iterations are initially performed to provide initial training. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the machine learning or artificial intelligence model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the machine learning or artificial intelligence model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the machine learning or artificial intelligence models may be generated using at least one from among an artificial neural network technique, a decision tree technique, a support vector machines technique, a Bayesian network technique, and a genetic algorithms technique.

In operation 407, a new sprint including a new task is started. According to exemplary aspects, a sprint may include one or more tasks. Further, a sprint may specify an end date or a duration of the sprint. In addition, a sprint or its task(s) may also indicate technical resources (e.g., computing (CPU, memory, server, environments, networks and/or etc.) requirements, technical team members, and etc.) assigned for completion by the specified end date. In an example, sprints may run for similar or differing time periods.

In operation 408, a cutoff time for the new task is determined. According to exemplary aspects, the cutoff time may indicate a time after starting the new sprint or task to determine whether the respective task will successfully be completed prior to the end date of the new sprint. For example, the cutoff time may specify end of or start of day 6 after starting the new sprint. In an example, the cutoff time may be manually specified for the sprint or automatically determined using a machine learning algorithm based on similarity of the new task or sprint with previously performed tasks or sprints.

In operation 409, the new task is processed until reaching the cutoff time. In an example, a cutoff time may be after day three to six after starting the sprint for a two to four week sprint.

In operation 410, change history of the new task up to the cutoff time is processed, and from the processed change history, chronological sequence of changes is extracted. The chronological sequence of changes up to the cutoff time is then computed for determining features to input into the machine learning model.

In operation 411, the computed features are then inputted into the machine learning model, and based on the computed features up to the cutoff time, the machine learning model determines whether the new task will be delayed or unable to be completed by the end date of the sprint.

In operation 412, based on the computed features up to the cutoff time, the machine learning model determines whether the new task will be delayed or not. If no delay is expected, processing of the new task is continued without further changes to the planned processing in operation 413. Alternatively, if delay is expected, such that the new task may not be completed by the end date of the sprint, planned processing of the new task is modified prior to its continuation in operation 414 to mitigate the expected delay so that the new task may be completed by the end of the sprint. According to exemplary aspects, modification to the planned processing may include adding of additional resources, modifying sequence of processing, or the like. In an example, additional resources may include adding additional technical resources, such as adding of computing resources, environments, network bandwidth, and the like. The additional resources may be procured from reserves that are not being utilized or from other tasks in the sprint.

The new task completes its processing in operation 415. In operation 416, the machine learning model utilized for predicting the delay is then updated with attribute information of the new task that was processed. The attribute information may include, without limitation, a description of the task performed, a type of task, change or adjustment history of processing of the new task, task completion time, resource allocation history, whether the task was successfully completed before the end of its sprint, and the like. By updating the machine learning model after a sprint, the updated machine learning model's accuracy may be continually refined, such that more sprints may be completed successfully and reduce downtime and computing inefficiencies for downstream computing operations.

In operation 417, the updated machine learning model is then deployed for predicting potential delays in subsequent sprints or tasks for mitigating potential delays and impact on downstream operations.

Figure 5:
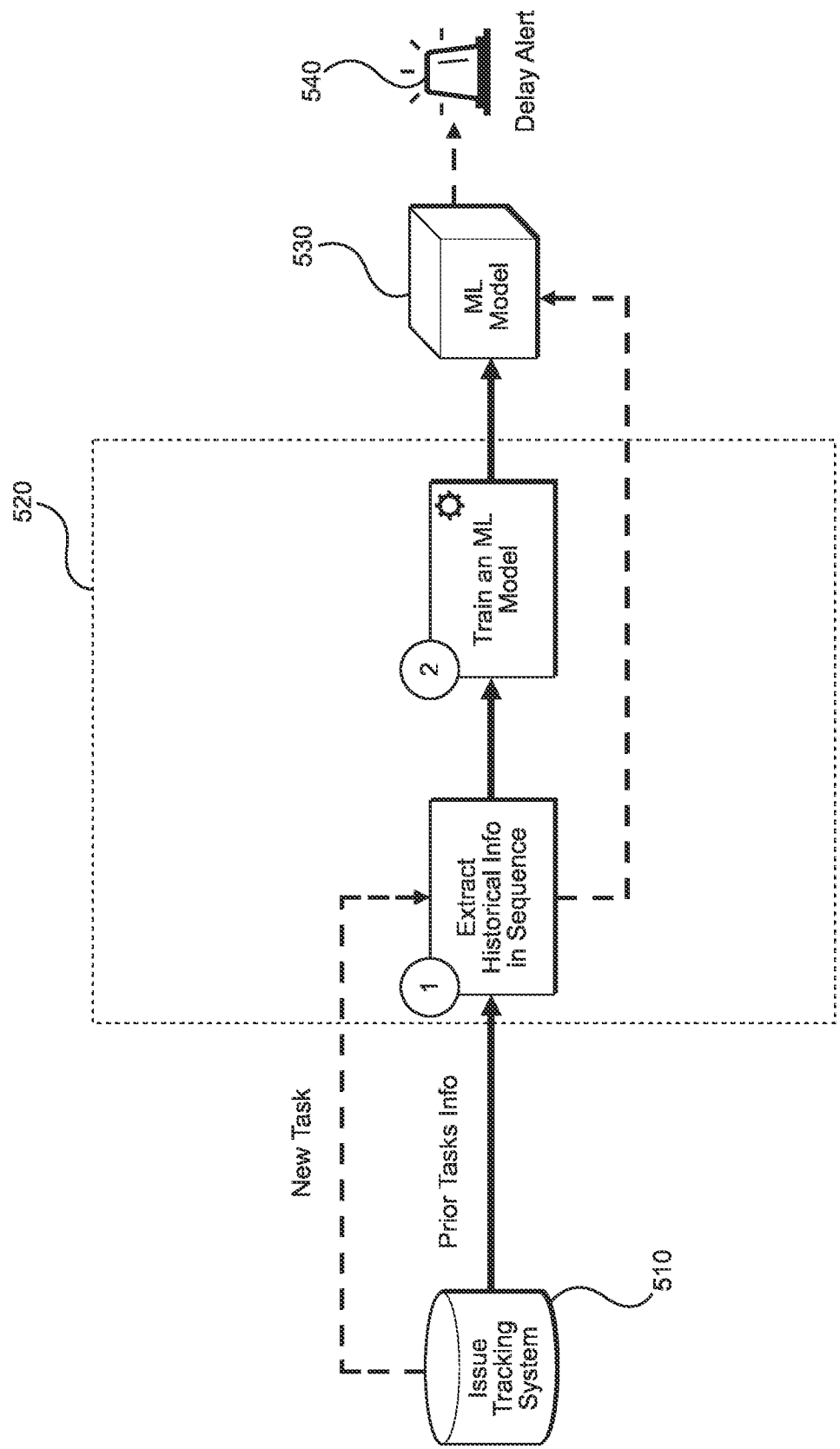
FIG. 5 illustrates a process flow for performing an early delay issue detection in accordance with an exemplary embodiment.

FIG. 5 illustrates a process flow for performing an early delay issue detection in accordance with an exemplary embodiment.

According to exemplary aspects, software developers use Issue Tracking Systems (ITS) to log and keep track of their work items. Atlassian Jira is a popular example of such systems. ITS may enable the software development teams to record their tasks and organize outstanding tasks into sprints. ITS may also record any change on tasks by the developers. Example of such changes are assigning the tasks to various resources, updating the description, adding comments, changing status, and the like. This historical information of changes may be utilized to predict if a particular task planned to be done by a the end of the current sprint may end up being delayed or not.

According to exemplary aspects, an EDID system includes an issue tracking system 510, an EDID machine learning model generation system 520, an EDID machine learning model 530 and a delay alert system 540.

According to exemplary aspects, the EDID machine learning model generation system 520 may extract previously resolved tasks from the issue tracking system 510. The EDID machine learning model generation system 520 may then performs analysis on the extracted history or the previously resolved tasks. Based on the analysis performed, the EDID machine learning model generation system 520 may further extract changes occurred to each task and store them in a chronological order that they took place. These chronological sequences may be used to calculate features to be used in the training of a machine learning model.

According to exemplary aspects, the chronological sequence may be collected up to a cut-off point from a sprint start date. For example, the cut-off point may be a prediction time, which may be up until day 3 or day 6. The cut-off point may be the day the trained machine learning model should be used to make a prediction. Final value of some of the task information at prediction time may be used as features.

In an example, a particular number (e.g., 23) of features may be extracted from the task information including the final value of the features at prediction time. The number of features extracted may include a mixture of default features and engineered features that were specifically created. In an example, extracted features may include, without limitation, issue type, priority, status, story point, total number of sub tasks, number of closed sub tasks, number of issue links, number of times flagged, number of comments added, assignee workload, and the number of changes happened to the following features since the sprint started: summary (title), description, issue type, priority, status, reporter, assignee, story point, sprint, fix version, release ticket, resolution, and/or team.

According to exemplary aspects, collective features are used by the EDID machine learning model generation system 520 to train a machine learning model. To perform this training, prior software tasks are divided into two groups. The first group includes tasks that were resolved by the end of their respective sprint (i.e., not delayed). The second group include tasks that were not resolved by the end of their respective sprint (i.e., delayed). The information included in the two groups are then used to train the EDID machine learning model 530, which may identify a group that a new task is likely to fall into, the first group or the second group.

The process flow of building the machine learning model is shown with solid arrows in FIG. 5. The dashed arrow, on the other hand, shows the process flow of how the model is used in action. Once a new sprint reaches to its cutoff point in time (i.e., prediction time), the change history of the tasks are processed to extract sequence of changes and compute the features. The previously trained EDID machine learning model 530 uses the features to predict if the task is prone to delay in its current situation. In an example, a Support Vector Machine (SVM) may be used as the EDID machine learning model 530. However, aspects of the present disclosure are not limited thereto, such that another suitable classification machine learning model may be utilized.

Moreover, according to further aspects, validation checks on creation of an issue tracking system task may be performed, such that if the respective task exhibits common features that are predictive of a delay (e.g., insufficient description), these tasks may be sent back to a developer to add more information before the start of a sprint. Furthermore, task-level delay predictions may be aggregated to project level delays such that intervention may be provided earlier before unnecessary technical resources (e.g., CPU utilization, memory usage, and etc.) are expanded. Based on earlier detection of potential delays, resource allocation or task schedules may be modified to better ensure sprint is concluded within deadline. By ensuring sprints are timely concluded, potential downtime or unnecessary waiting by downstream processes may be avoided, to improve utilization efficiency of technical or computing resources.

According to exemplary aspects, the delay alert system 540 may receive a signal to provide an alert from the current or most recently updated EDID machine learning model 530 when the EDID machine learning model 530 predicts that a potential delay may be incurred in the respective sprint. The delay alert system 540 may in response transmit alert notification to relevant systems or team members. In an example, alert notification may be transmitted as an email, a text message, a chat message, an automated phone call or the like. However, aspects of the present disclosure are not limited thereto, such that the delay alert system 540 may provide a visual alert by flashing lights or outputting a sound signal by one or more speakers. In another exemplary aspects, the delay alert system 540 may request or automatically allocate additional resources based on resource availability for resolving or mitigating the potential delay.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for determining and mitigating a potential delay in task completion, the method comprising:
    extracting, by a processor, a plurality of previously resolved tasks and related information;
    analyzing, by the processor, the extracted plurality of previously resolved tasks and related information;
    extracting, by the processor, changes occurred to each of the plurality of previously resolved tasks;
    calculating, by the processor, features for training a machine learning model based on the extracted changes;
    dividing, by the processor, the plurality of previously resolved tasks into different groups, wherein the different groups include previously resolved tasks that were completed prior to a specified timepoint, and previously resolved tasks that were completed subsequent to the specified timepoint, and wherein the different groups are further separated based on amount of time completed before or after the specified timepoint;
    training, the machine learning model, using the calculated features associated with the different groups of the plurality of previously resolved tasks;
    based on the training using the different groups, recognizing actions or adjustments that are ineffective in mitigating a risk of incompletion;
    starting, by the processor, a sprint including a target task;
    determining, by the processor, a cutoff time for determining whether the target task will be completed by an end date of the sprint;
    processing, by the processor, the target task until reaching the cutoff time;
    upon reaching the cutoff time, processing change history of the target task up to the cutoff time and before the sprint is completed, and extracting a sequence of changes included in the change history;
    executing the machine learning model using the extracted sequence of changes for determining whether a delay is expected or not for the target task;
    updating the machine learning model with processing information of the target task; and
    executing the updated machine learning model on a subsequent task for determining whether the subsequent task will be completed prior to completion of its respective sprint;
    when the delay is not expected, continue the processing of the target task without modification until completion of the target task.

2. The method according to claim 1, further comprising:
    when the delay is expected, modifying the processing of the target task and continue the modified processing of the target task until completion of the target task.

3. The method according to claim 2, wherein the modifying includes a modification to allocated resources for the processing of the target task.

4. The method according to claim 2, wherein the modifying includes a modification to a sequence of the processing of the target task.

5. The method according to claim 1, wherein the different groups include a first group of tasks that were completed within their respective sprints, and a second group of tasks that were unable to be completed within their respective sprints.

6. The method according to claim 1, further comprising:
    outputting a delay alert when the delay is expected for the target task.

7. The method according to claim 6, wherein the delay alert is a sound signal outputted by a speaker.

8. The method according to claim 6, wherein the delay alert is a flashing light.

9. The method according to claim 6, wherein the delay alert is an automated voice call.

10. The method according to claim 6, wherein the delay alert is a text transmission to a receiving device.

11. The method according to claim 1, wherein the machine learning model is a neural network model.

12. The method according to claim 1, wherein the cutoff time is at most six days after starting the sprint.

13. The method according to claim 1, wherein the cutoff time is determined by the machine learning model.

14. The method according to claim 1, wherein the changes occurred to each of the plurality of previously resolved tasks are extracted in sequence.

15. The method according to claim 1, wherein the plurality of previously resolved tasks is divided based on a task type, completion time period and resource allocation.

16. A system for determining and mitigating a potential delay in task completion, the system comprising:
at least one memory; and
at least one processor,
wherein the system is configured to perform:
extracting a plurality of previously resolved tasks and related information;
analyzing the extracted plurality of previously resolved tasks and related information;
extracting changes occurred to each of the plurality of previously resolved tasks;
calculating features for training a machine learning model based on the extracted changes;
dividing the plurality of previously resolved tasks into different groups, the different groups include a first group and a second group, wherein the different groups include previously resolved tasks that were completed prior to a specified timepoint, and previously resolved tasks that were completed subsequent to the specified timepoint, and wherein the different groups are further separated based on amount of time completed before or after the specified timepoint;
training, the machine learning model, using the calculated features associated with the different groups of the plurality of previously resolved tasks;
based on the training using the different groups, recognizing actions or adjustments that are ineffective in mitigating a risk of incompletion;
starting a sprint including a target task;
determining a cutoff time for determining whether the target task will be completed by an end date of the sprint;
processing the target task until reaching the cutoff time;
upon reaching the cutoff time, processing change history of the target task up to the cutoff time and before the sprint is completed, and extracting a sequence of changes included in the change history;
executing the machine learning model using the extracted sequence of changes for determining whether a delay is expected or not for the target task;
updating the machine learning model with processing information of the target task; and
executing the updated machine learning model on a subsequent task for determining whether the subsequent task will be completed prior to completion of its respective sprint;
when the delay is not expected, continue the processing of the target task without modification until completion of the target task.

17. A non-transitory computer readable storage medium that stores a computer program for determining and mitigating a potential delay in task completion, the computer program, when executed by a processor, causing a system to perform a plurality of processes comprising:
extracting a plurality of previously resolved tasks and related information;
analyzing the extracted plurality of previously resolved tasks and related information;
extracting changes occurred to each of the plurality of previously resolved tasks;
calculating features for training a machine learning model based on the extracted changes;
dividing the plurality of previously resolved tasks into different groups, the different groups include a first group and a second group, wherein the different groups include previously resolved tasks that were completed prior to a specified timepoint, and previously resolved tasks that were completed subsequent to the specified timepoint, and wherein the different groups are further separated based on amount of time completed before or after the specified timepoint;
training, the machine learning model, using the calculated features associated with the different groups of the plurality of previously resolved tasks;
based on the training using the different groups, recognizing actions or adjustments that are ineffective in mitigating a risk of incompletion;
starting a sprint including a target task;
determining a cutoff time for determining whether the target task will be completed by an end date of the sprint;
processing the target task until reaching the cutoff time;
upon reaching the cutoff time, processing change history of the target task up to the cutoff time and before the sprint is completed, and extracting a sequence of changes included in the change history;
executing the machine learning model using the extracted sequence of changes for determining whether a delay is expected or not for the target task;
updating the machine learning model with processing information of the target task; and
executing the updated machine learning model on a subsequent task for determining whether the subsequent task will be completed prior to completion of its respective sprint;
when the delay is not expected, continue the processing of the target task without modification until completion of the target task.

* * * * *